Aug. 24, 1926.
E. E. NOVOTNY ET AL
1,597,538
ORNAMENTATION OF LAMINATED FIBER
Filed Feb. 5, 1924
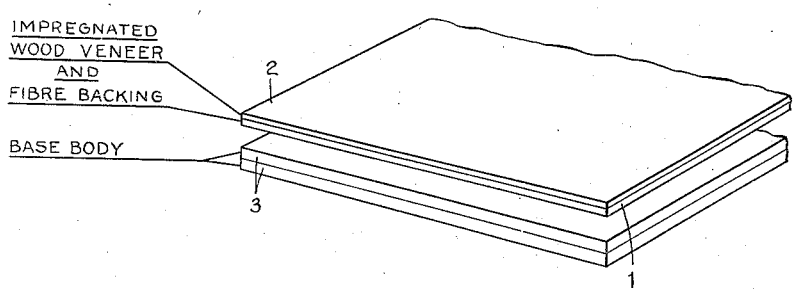
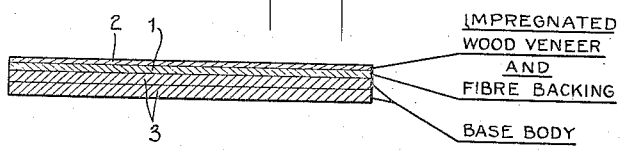
INVENTORS
Emil E. Novotny
Charles J. Romieux
BY
ATTORNEYS Patented Aug. 24, 1926.

1,597,538

UNITED STATES PATENT OFFICE.

EMIL E. NOVOTNY, OF LOGAN, PHILADELPHIA, PENNSYLVANIA, AND CHARLES J. ROMIEUX, OF ELIZABETH, NEW JERSEY, ASSIGNORS TO JOHN STOGDELL STOKES, OF HUNTINGDON VALLEY POST OFFICE, PENNSYLVANIA.

ORNAMENTATION OF LAMINATED FIBER.

Application filed February 5, 1924. Serial No. 690,881.

This invention relates to the ornamentation of laminated fiber and to the process of making the same. It is more particularly directed, however, to the ornamentation of laminated fiber by means of natural wood veneers. Furthermore, the production of such ornamented laminated fiber in combination with synthetic resin substances such as phenolic condensation products, some of which are known under the trade names of bakelite, condensite and durite. These resins are well known in the art. There are others, however, that may likewise be used, particular stress being laid on those types of resins which are capable of undergoing chemical reaction under heat or under heat and pressure.

In our co-pending application dated September 4, 1923, Serial No. 660,951, we have described, generally, a method whereby a real natural wood finish could be given laminated fibrous structures. The present application, however, is in the nature of a more specific improvement on the methods described therein, and represents the pertinent details learned through experimentation in order that a highly satisfactory commercial product could be produced in large commercial sizes. Our experimentation developed the fact that the commercialization of this type of product presents a great many difficulties where actual production of finely finished work as to surface, continuity of grain, freedom from cracks, etc., are concerned.

Although it is well known that ordinary, say, radially cut, wood veneer can be produced in comparatively large sheets, it is difficult to keep such veneer flat and free from warpage unless it is preliminarily steamed or contains a high percentage of moisture. If it is made in thick sections, it is not suitable for many purposes we have in mind, inasmuch as the wood portion of a pressed laminated sheet will look and act differently at the surface than the impregnated paper portions of such laminated composite structure. When produced in thin sheets, however, it cannot readily be handled in the process without excessive warping, cracking and breaking. And furthermore, it is not readily possible to obtain cheaply, large sections of relatively rare and expensive wood.

Where such veneer is used as ordinarily in cementing or gluing with ordinary cement or glues to another body of relatively thicker wood, small breaks and cracks can very readily be brought together so that the surface is not marred thereby. Furthermore, such sheets may be moistened and, as a matter of fact, the application of the glue itself moistens such veneer sufficiently so that it is rendered more pliable and less likely to break and crack. This condition, however, is not true where synthetic resins such as those mentioned in the first paragraph are used, inasmuch as it is very objectionable to carry any abnormal amount of moisture in the veneer after such varnish or resin has been dried as during the process of impregnation and drying. This drying out of moisture from the veneer is apt to produce a wrinkled, dry, crisp product which is very apt to crack. Although we have had fair success in heating the impregnated sheets of veneer and assembling them with the laminated sheets while hot, and holding them in flat juxtaposition to the assembled fibrous sheets by applying metal facing sheets on either face thereof, this method does not give the most satisfactory results. It should be understood that any crack or blemish in a sheet of relatively thick veneer will permit the resin to fill such break and that an unsightly blemish will occur which cannot be repaired and means the rejection of the entire molded composite structure.

The following method obviates these difficulties and permits the production of ornamented laminated synthetic resin products having a face or faces of natural wood veneer in any size sections which it may be necessary to produce with the grain, color and surface appearance thoroughly matched in a pleasing continuity of design. This is accomplished by using a veneer of no greater thickness than necessary; as a matter of fact, we have used veneers as thin as .0015" which have been cut from rare woods, producing sections only a few inches wide and which have been matched in continuity of grain as closely as the finest veneering practiced by the cabinet and instrument makers wood working art. In addition to this, however, we have, through molding against highly polished plates and using the veneer which is impregnated or surfaced with synthetic resin, produced a surface finish of higher polish than could be obtained through repeated varnishing and hand rubbing. In addition to this, the surface is very tough and hard, is moisture repellent, not readily affected by hot water, ordinary solvents, weak acids or alkalies, and presents a very pleasing surface finish.

In order that our invention may be understood we will describe the preferred manner of practicing the same.

In the accompanying drawing—

Fig. 1 is a partial perspective view of the constituents of the laminated body, the veneer and fiber backing sheets being shown as separate from the base or support.

Fig. 2 is a cross-sectional view showing the sheets as united under heat and pressure.

Referring to the accompanying drawings in detail, the numeral 1 indicates the fiber or paper backing sheet for the face or wood veneer sheet which is shown at 2, while the numeral 3 indicates a base body formed of laminations or layers of fiber.

All of these sheets forming a composite body are preferably impregnated with synthetic resinous material, as hereinafter described.

The fiber backing sheet 1 preferably is made especially for this purpose by beating up cotton pulp in the beaters of a paper mill. To this beaterload is preferably added a suitable opaque material such as lithopone or china clay, preferably in the portions of equal parts by weight of filler to cotton pulp. To this mass may be added any suitable material which will tend to keep the filler in proper suspension as is well known in the art. This mass, properly diluted, is transferred to the paper mill where it is made up into sheets of suitable thickness. Where a thin wood veneer is to be used, sheets of only about .0035" are necessary. However, where a heavy veneer is to be used, the sheets may be somewhat thicker in order that the paper may have sufficient strength to hold the veneer substantially flat. This paper may now be used as a support for the veneer sections 2 to be mounted thereon by means or ordinary glue, such as, for example, a casein cold glue of proper consistency. The veneer is cut in uniform, square or rectangular sections so it may be properly and quickly fitted and matched. Where a thin veneer is used, the edges of these sections may be overlapped somewhat. This overlap, if done uniformly, will not show on the finished piece after it has been pressed. In this particular example it is best to use a glue or cement which is not soluble or which will not lose its adhesive power when immersed in an alcohol solution of durite varnish. This composite sheet of paper and wood veneer may be formed in roll form in order that the impregnation and drying may be done as a continuous process. This helps to hold the paper and veneer under the tension rolls until the sheets are dried, whereupon they may be rolled to be subsequently cut up into proper sheet sizes, ready for use as facing sheets. This also helps considerable in the handling and in the prevention of undesirable warpage. Of course, it is commercially possible to handle these composite sheets in sheet form where each sheet, of course, must be individually handled before and after the impregnation and during the drying process. Suitable stretcher frames are preferable for use with these loose sheets in order to prevent buckling and warpage.

The composite sheet of wood veneer and paper is impregnated in a varnish consisting preferably of 90 parts of varnish made from phenol and furfural and 10 parts of varnish made from phenol and benzaldehyde. This varnish, to be most suitable, is in the proportion of approximately 80 parts of resin to 100 parts of alcohol, both by weight. Ordinarily, but one impregnation is all that is necessary. The solvent is evaporated and the sheet is given a precure for approximately 20 minutes at a temperature of 260 degrees F. This precure is given in order that the resin on the face of the veneer will have only a sufficient flow to properly reproduce the high polish of the surface plates. The resin within the veneer and in and on the face of the backing sheet will have only a limited flow so that it will bond all particles together but will effectively prevent an abnormal flow of resin from the inside of the laminated sheets when it is finally pressed into finished form. The exact amount of precure cannot be definitely specified inasmuch as some resins are more reactive at given temperatures than others, but the precure should be such that there will be no surface marring of the veneer due to dark portions or sections of varnish appearing on the surface.

The impregnated sheets of paper or cloth which are used for the base body portion 3 are incorporated with suitable cementitious material such as our durite varnish, in a manner already well known to the art. They are likewise given a short precure during the removal of the alcohol solvent by being heated in the continuous process of impregnation for a period of from 6 to 12 minutes at a temperature of about 240 to 260 degrees F. The resin in these sheets should have more flow if a strong mechanical structure is desired. Where such sheets are cured for long periods, the resultant product therefrom may show high dielectric properties but the mechanical strength will be low.

One or more of these facing sheets of wood veneer backed with paper are applied to one or more of the faces of the laminated impregnated material in order to form a suitable predetermined thickness. They are placed between polished surface plates which are, in turn, placed between suitable heated platens of a hydraulic press and combined at pressures of from 500 to 2000 pounds to the square inch at suitable temperatures of, say, from 300 to 400 degrees F. for some 5 to 44 minutes; whereupon the platens are cooled, the surface plates with the finished product removed therefrom, and the finished product is ready for cutting to suitable sizes.

With this arrangement, we find that extremely thin veneers can be handled, and that they are, therefore, relatively inexpensive and can be turned out in large quantities and in large size sheets. Of course, we do not necessarily limit ourselves to any given thickness of veneer inasmuch as this invention comprises the method of assembling sheets of veneer of any thickness in proper relation to each other in order that a pleasing continuity of grains is thus produced and a means whereby the varnish of the interior is prevented from darkening the surface of the veneer, which, if not regulated, would so darken the sheet that the grain of the veneer would not be visible in such darkened portions.

Although we find it particularly advantageous to use the varnish mixture composed of phenol furfural and phenol benzaldehyde resins, we do not necessarily limit ourselves to this particular mixture as either of the resins and, for that matter, any of the thermo reactive synthetic resins could be used in their stead. We do find, however, that this particular mixture produces a surface of extreme brilliancy which we have not been able to obtain with other resin mixtures. The use of the benzaldehyde resin in combination with the furfural resin prevents the oxidation or discoloring of the furfural resin on the surface. This is either due to an anti-catalytic effect which benzaldehyde resin has on the furfural resin, or else it is due to the fact that the benzaldehyde resin is of relatively lower melting point and comes to the surface first and retains the furfural resin in its undarkened form. The benzaldehyde resin alone does not produce finishes as brilliant as the combination of the two. Of course, commercial results could be secured by the use of other light colored resins either alone or in combination with each other or with the furfural resin. The various forms of phenol aldehyde resin which would be suitable are those made of phenol formaldehyde, phenol acetaldehyde or phenol glycerine, the idea being to use a resin which is somewhat lighter in color and which, as before stated, apparently has a tendency to come to the surface and eliminate surface darkening and oxidation.

While we have herein shown and described the preferred embodiment of our invention, we wish it to be understood that we do not confine ourselves to all the precise details herein set forth by way of illustration, as modification and variation may be made without departing from the spirit of the invention or exceeding the scope of the appended claims.

What we claim is—

1. A laminated body comprising a composite sheet composed of a wood veneer facing sheet and a fibrous backing sheet permanently united with the veneer sheet, and both impregnated with a hard and set synthetic resin, and a supporting base permanently united to the composite sheet.

2. A laminated body comprising a composite sheet composed of a veneer facing sheet and a fibrous backing sheet glued thereto, said composite sheet being impregnated with a hard and set synthetic resin, and a fibrous base body also impregnated with a hard and set synthetic resin, permanently united with the composite sheet.

3. A laminated body comprising a composite sheet composed of a facing sheet of wood veneer and a backing sheet of fibrous material, said composite sheet having incorporated therein a synthetic resin consisting of a mixture of phenol-furfural and phenol-benzaldehyde resins.

4. The herein-described method which consists in forming a composite sheet by gluing a facing sheet of wood veneer on a backing sheet of fibrous material, treating such composite sheet with a synthetic resin, and subjecting such composite sheet to the combined action of heat and pressure, thus hardening and setting the synthetic resin.

5. The herein-described method which consists in forming a composite sheet by gluing a facing sheet of wood veneer on a backing sheet of fibrous material, treating such composite sheet with a synthetic resin, and subjecting such composite sheet to the combined action of heat and pressure, thus hardening and setting the synthetic resin, and then applying said composite sheet to a fibrous base body also impregnated with synthetic resin, and subjecting the parts thus assembled to the combined action of heat and pressure to unite the composite sheet with the base body.

Signed at Philadelphia, in the county of Philadelphia and State of Pennsylvania, this fourth day of February A. D. 1924.

EMIL E. NOVOTNY.
CHARLES J. ROMIEUX.